United States Patent Office 3,023,717
Patented Mar. 6, 1962

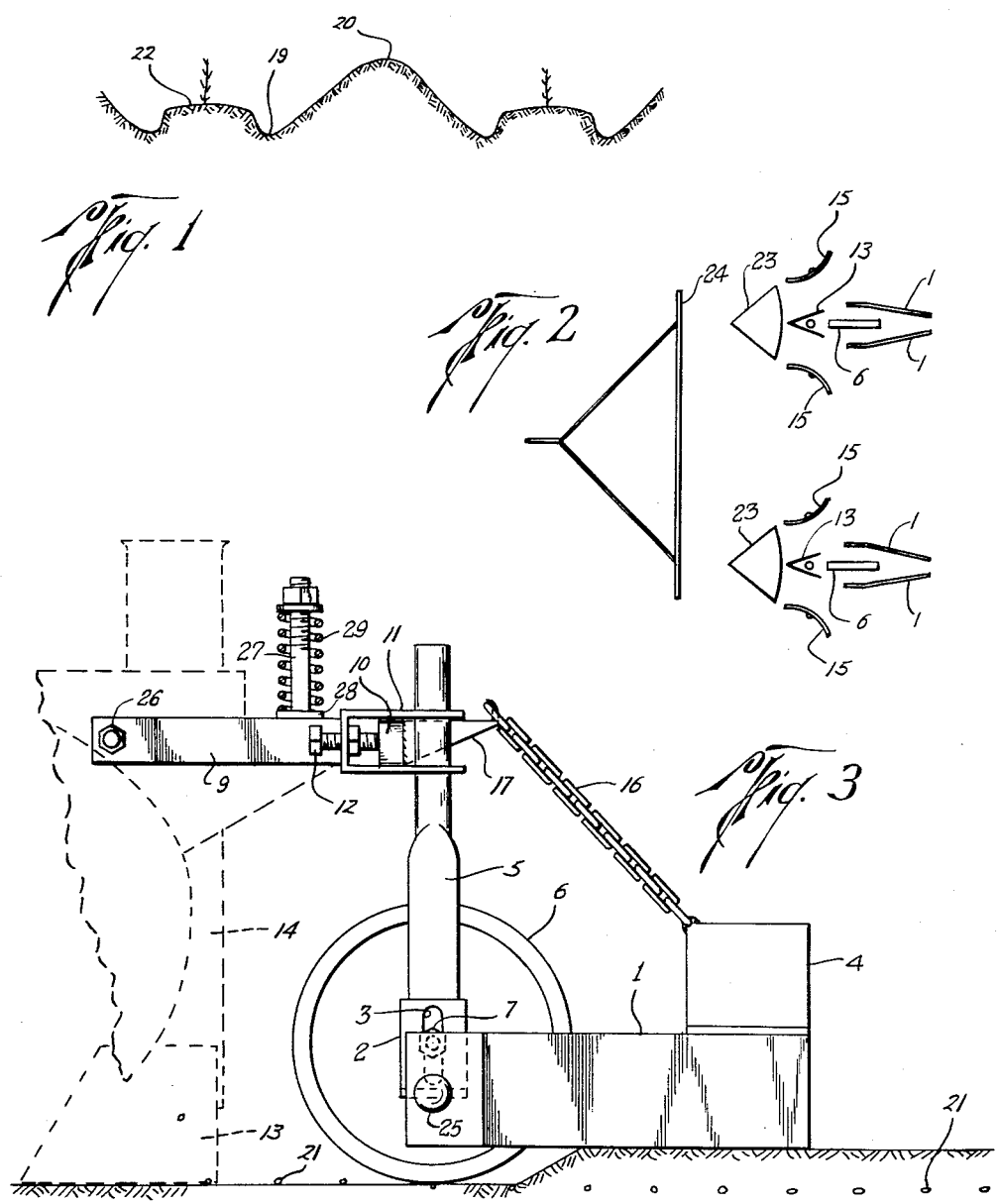

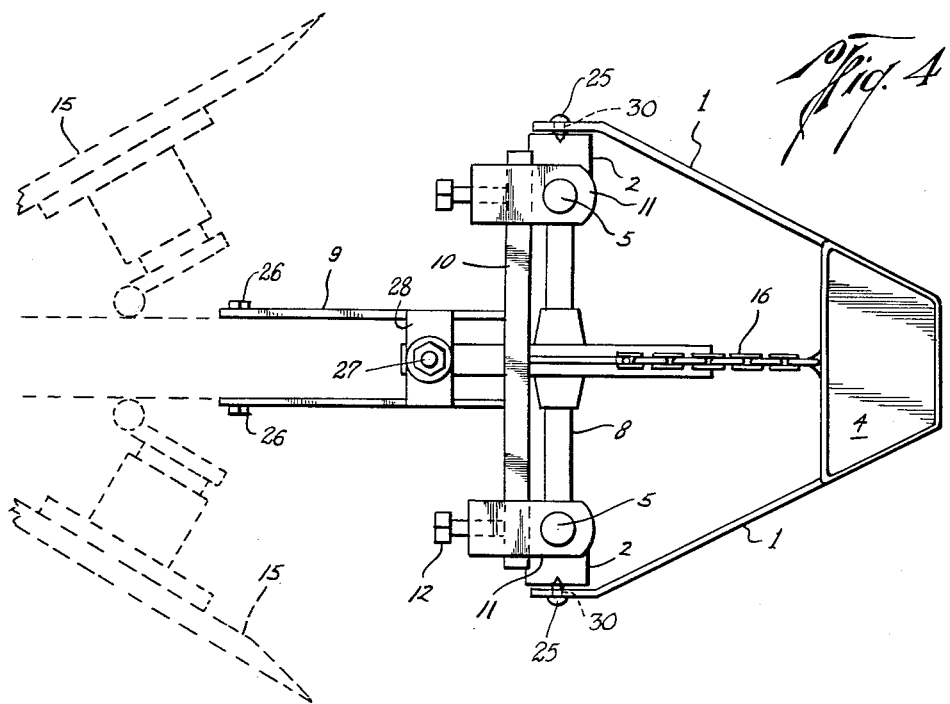
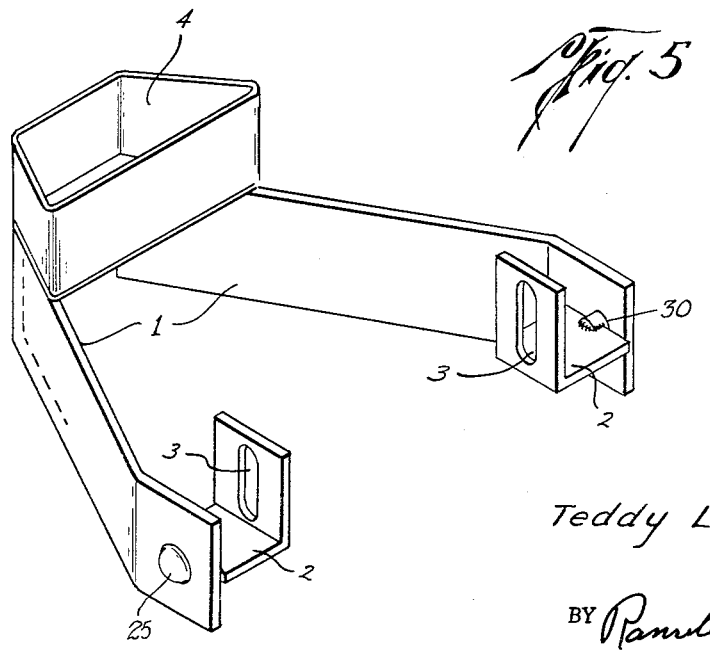

3,023,717
SEED BED FORMING DEVICE
Teddy L. Cline, Rush Springs, Okla.
Filed Dec. 1, 1958, Ser. No. 777,297
4 Claims. (Cl. 111—81)

This invention relates to new and useful improvements in a seed bed forming device.

It is an object of this invention to provide a forming device for operation over a seed bed which will apply the desired packing effect on the soil of the bed and which will shape the top of the bed to prevent the forming of water traps thereon.

In planting, seed beds must be formed to protect the seed during its germinating period from the effects of rain washing away the soil about the seed and from standing on the seed bed itself. The beds are formed in deep furrows so that the plants will be protected from wind and to provide soil for movement over the seed bed as the plants grow. The methods used at the present time for forming these beds provides a seed covering device which adequately covers the seed, but which, working entirely on the seed bed itself, moves the soil inwardly and forms a recess on the top of the seed bed which forms a water trap. It is an object of this invention to provide a seed covering device that will cover the seed and firm the soil over the seed and which will shape the top of the bed to eliminate any recess and to properly drain water from the seed bed.

It is still another object of the invention to provide a seed bed covering and forming device provided with means for varying the pressure on the seed bed to adapt the device to various types of soil.

With the above and other objects in view, the invention has relation to certain novel features of construction, operation and arrangement of parts more particularly defined in the following specifications and illustrated in the accompanying drawings, wherein:

FIGURE 1 is a plan view of the formed seed bed.

FIGURE 2 is a diagrammatic view of the seed bed forming means.

FIGURE 3 is a side elevational view of the device as attached to a planter.

FIGURE 4 is a top view of the device attached to a planter, and

FIGURE 5 is a front perspective view of the seed bed forming device.

Referring now more particularly to the drawings, the numerals 1, 1 designate a pair of converging side bars formed of flat rigid material and which have connecting angle straps 2, 2 mounted on the inside walls of the side bars 1, 1 adjacent the extended end thereof, by means of the pins 25, 25 which extend transversely through suitable ports in the side bars 1, 1 and are free to pivot therein. The ports through which the pins 25, 25 extend are designated as 30, 30. The upstanding portion of these straps 2, 2 are provided with longitudinal slots 3, 3. The bars 1, 1 are parallel adjacent their connecting ends and on the opposite ends of these bars is mounted a weight box 4. The connecting ends of the bars 1, 1 are adjustably secured to the vertical firming wheel standards 5, 5 on which the axle 8 bearing the usual firming wheel 6 is rotatably mounted. Suitable bolts as 7, 7 are vertically adjustable in the slots 3, 3 to maintain the angle irons 2, 2 and the pivotally connected ends of the bars 1, 1 in the desired position on the standards 5, 5. An axle 8 extends transversely from the standards 5, 5 through the wheel 6. The standards 5, 5 are secured to the framework 9 of the planter by means of the cross bar 10 on which the standard receiving members 11, 11 are mounted. The standards 5, 5 extend through the standard receiving members 11, 11 and are vertically adjustable therein and may be anchored in the desired position by means of suitable set bolts 12, 12.

On the planter are the usual trench forming shoe 13 and seed chute 14, and the earth moving discs 15, 15. The members 9, 9 of the framework are pivotally mounted on the planter by means of the bolts 26, 26 and are maintained yieldably in horizontal alignment with the planter by means of the bolt 27 extending through the cross member 28 which joins the members 9, 9, and the spring 29.

The bars 1, 1 are mounted on the standards 5, 5 so that the ends of the bars 1, 1 having the weight box 4 are at a slightly lower level than the connecting ends. A chain 16 is connected to the projecting member 17 on the planter framework to maintain the desired vertical adjustment of the members 1, 1 when sufficient weight is added to the weight box 4 to provide the pressure desired for the type of soil being worked.

As the planter is drawn by the draw means 24 over the field being planted, the plow 23 breaks the ground and the discs 15, 15 form the furrows and rows 19 and 20. The shoe 13 forms a trench in the area between the furrows 19 and the seed 21 is dropped from the hopper 14 into the trench and the firming wheel 6 presses the seed into the trench bottom. The side bars 1, 1 move the soil back over the seed and the rear ends of the bars 1, 1 being at a slightly higher level than the connected ends of the bars will cause a movement of a greater amount of soil over the center of the bed, and will form a convex surface on the bed as shown at 22, and the weight box 4 will pack the earth so formed firmly over the seed bed so that water will readily flow off of the top of the seed bed into the furrows between the seed bed and the protecting rows 20, 20.

While the foregoing is considered a preferred form of the invention, it is by way of illustration only, the broad principle of the invention being defined by the appended claims.

What I claim is:

1. In an attachment for planters having row forming means, seed hoppers and chutes, a framework mountable on the planter and extending from the rear thereof, firming wheel standard receiving and adjustable means on the framework, a pair of firming wheel standards vertically adjustable in the said receiving means, an axle connecting said standards, a firming wheel mounted on said axle between the standards and in longitudinal alignment with the row forming means, angle iron means vertically adjustable on the lower ends of said standards, a portion of said angle irons being horizontal, the horizontal portion of said angle irons extending outwardly, a pair of rearwardly converging bars having one end of each bar in parallel alignment, pins extending transversely through said parallel ends on which said bars are free to rotate, said pins being fixedly mounted on the outwardly extended ends of said angle irons, a weight receiving box on the rearwardly converging ends of said bars and means extending from said weight receiving box to said framework to limit the downward movement of said box.

2. In a seed bed forming device for use on a planter having a trench forming shoe comprising a framework, a firming wheel means in longitudinal alignment with said trench shoe and having vertical firming wheel standards, standard receiving and adjusting means on said framework, said vertical wheel standards extending through said receiving means and being adjustable therein and said firming wheel means being rotatably mounted between said standards and supported thereby, a pair of vertically adjustable side bars and each having bolt receiving link means at one end thereof adjustably secured to bolt retaining means on said firming wheel standards and each of the other ends of said bars extending rearwardly and inwardly, a weight box means for applying pressure to the loose soil moved by said side bars transversely secured to the rearwardly extending ends of said bars and maintaining said bars spaced apart and a stop means extending from said planter to said weight box to maintain said extended ends of said bars at the desired level.

3. In a seed bed forming device for use on a planter having earth moving discs, a seed hopper, a chute and a trench shoe, a framework mounted on said planter, a firming wheel means on said framework in longitudinal alignment with said trench shoe, the seed chute on said planter directing seed from a supply of seed into a trench formed by said trench shoe, said firming wheel having vertically adjustable standards mounted on said framework, standard receiving and adjusting means mounted on said framework, said firming wheel means being rotatably mounted between said standards, a pair of rearwardly converging bars having vertically adjustable connecting link means at one end pivotally securing the bars to said firming wheel standards and the other ends of said bars extending rearwardly and a weight box for receiving weight material transversely fixed on said extended ends of said bars.

4. In a seed bed forming device for use on a planter having earth moving discs and a trench shoe, a rigid framework drawn by said planter, a firming wheel means on said framework in longitudinal alignment with said trench shoe and a hopper on said planter for directing seed from a supply of seed into a trench formed by said trench shoe, said firming wheel means being rotatably mounted between vertically adjustable supports mounted on said planter, support receiving and adjusting means mounted on said framework, a pair of bars parallel in part having vertically adjustable connecting link means at one end pivotally securing the bars to said firming wheel supports and the other ends of said bars converging and extending upwardly and a weight box for receiving weight material transversely fixed on and between said extended ends of said bars and an upwardly yieldable stop means for limiting the downward movement of said weight box connected at one end to said weight box and at the other end to said framework.

References Cited in the file of this patent

UNITED STATES PATENTS

| | | |
|---|---|---|
| 276,034 | Harrison | Apr. 17, 1883 |
| 319,659 | Altland | June 9, 1885 |
| 605,322 | Montgomery et al. | June 7, 1898 |
| 676,476 | Secor | June 18, 1901 |
| 909,991 | Cole | Jan. 19, 1909 |
| 997,626 | Lindgren | July 11, 1911 |
| 1,107,224 | Perrine | Aug. 11, 1914 |
| 1,226,800 | Olson | May 22, 1917 |
| 1,247,744 | Trimble | Nov. 27, 1917 |
| 1,247,763 | White | Nov. 27, 1917 |
| 1,259,826 | Bloom | Mar. 19, 1918 |
| 1,635,866 | Townsend et al. | July 12, 1927 |
| 1,882,603 | Honer | Oct. 11, 1932 |
| 1,901,298 | Johnson | Mar. 14, 1933 |
| 2,155,891 | Campbell | Apr. 25, 1939 |
| 2,735,350 | Estes | Feb. 21, 1956 |
| 2,771,044 | Putifer | Nov. 20, 1956 |